US006577910B1

(12) United States Patent
Eastty et al.

(10) Patent No.: US 6,577,910 B1
(45) Date of Patent: Jun. 10, 2003

(54) DIGITAL AUDIO SIGNAL PROCESSORS

(75) Inventors: Peter Charles Eastty, Eynsham (GB); Peter Damien Thorpe, Botley (GB); Christopher Sleight, Chipping Norton (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/178,341

(22) Filed: Oct. 23, 1998

(30) Foreign Application Priority Data

Oct. 24, 1997 (GB) ............................................ 9722530

(51) Int. Cl.[7] ............................................... G06F 17/00
(52) U.S. Cl. ......................................... 700/94; 341/143
(58) Field of Search ............................ 700/94; 341/61, 341/143, 144, 155, 126

(56) References Cited

U.S. PATENT DOCUMENTS 4,460,890 A * 7/1984 Busby ......................... 341/61
4,993,073 A 2/1991 Sparkes
5,060,272 A 10/1991 Suzuki
6,175,322 B1 * 1/2001 Eastty et al. ................ 341/143

FOREIGN PATENT DOCUMENTS

GB 2 299 493 10/1996

* cited by examiner

*Primary Examiner*—Minsun Oh Harvey
(74) *Attorney, Agent, or Firm*—Frommer Lawrence & Haug LLP; William S. Frommer; Darren M. Simon

(57) ABSTRACT

A digital audio signal processor processes digital audio signals having a first sampling rate S1. The processor has a multiplicity of manually adjustable controls (403) for setting desired parameters of signals to be processed. Sampling means (404) sample each control (403) setting at a second sampling rate S2 less than the first rate S1 to determine the settings thereof. Applying means (401) responsive to the sampling means apply the sampled settings to the signals. For each control the applying means determines the difference of successive samples of setting and applies to the signal, subject to control by that control, increments of setting each increment being a predetermined fraction 1/n of the said difference at a rate nS2 which is n times the said second sampling rate S2.

4 Claims, 5 Drawing Sheets

DIGITAL AUDIO SIGNAL PROCESSORS

BACKGROUND OF THE INVENTION

Field of the Invention

The present invention relates to a digital audio signal processor and to the control of signal parameters such as gain in such a processor.

Description of the Prior Art

Whilst the present invention may be applied to the control of parameters other than gain, for simplicity and clarity of description, it will be described herein with reference to gain.

In an audio signal mixer, for each output channel there is a plurality of input channels each having at least one manually operated control for controlling gain (or some other parameter). Digital mixers operate on sampled and digitised signals sampled at a rate S1 greater than the Nyquist rate such as 44.1 KHz or 48 KHz. In a digital signal processing channel, gain is controlled by multiplying the digital signal sample values by numbers representing the desired gain using digital multipliers. The desired gain values are set by manually adjusted gain controls.

There is proposed herein a digital audio signal mixer in which a set of manually adjustable gain controls are linked to a digital signal mixer by a control processor (e.g. a computer) and which samples the gain controls. The large number of gain controls are sampled at a rate S2 which much less than the sampling rate S1 of the digital signals because there is a large number of such controls.

The present invention is concerned with the situation in which a relatively low sampling rate of gain (and/or other) controls would result in the gain (and/or other transfer characteristic) of an audio signal processor changing in steps at a rate at which an undesired artifact (i.e. an article effect produced by the manner in which the processor processes signals) which would be audible in the processed audio signal. One example of such an artifact is known as “zipper noise”.

SUMMARY OF THE INVENTION

According to the present invention there is provided a digital audio signal processor for processing digital audio signals having a first sampling rate S1, the processor having a multiplicity of manually adjustable controls for setting desired parameters of signals to be processed, means for sampling the setting of each control at a second sampling rate S2 less than the first rate S1 to determine the settings of the said controls, and means responsive to the sampling means for applying the sampled settings to the signals, wherein for each control the applying means determines the difference of successive samples of setting and applies, to the signal subject to control by that control, increments of setting each increment being a predetermined fraction 1/n of the said difference at a rate nS2 which is n times the said second sampling rate S2.

The rate nS2 is less than or equal to S1. Preferably nS2 equals S1. Preferably n is an integer and more preferably is an integer power of two. Preferably n is fixed.

Thus by incrementing e.g. the gain by fractions 1/n of the gain change set by the manual control at a rate nS2 , audible artifacts are reduced.

According to an embodiment of the present invention, the signal processor is a mixer for 1-bit signals. An embodiment of such a mixer comprises an nth order (where n is greater than or equal to 1) Delta Sigma Modulator (DSM) having a first input for receiving a first 1-bit signal, a second input for receiving a second 1-bit signal, a quantizer for requantizing a p bit signal to 1-bit form the requantized signal being the output signal of the processor, a plurality of signal combiners including a first combiner for forming an integral of an additive combination of the product of the first signal and a first coefficient and of the product of the second signal and a second coefficient and of the product of the output signal and a third coefficient, at least one intermediate combiner for forming an integral of an additive combination of the product of the first signal and a first coefficient and of the product of the second signal and a second coefficient and of the product of the output signal and a third coefficient and of the integral of the preceding stage, and a final combiner for forming an additive combination of the product of the first signal and a first coefficient and of the product of the second signal and a second coefficient and of the integral of the preceding stage to form the said p bit signal which is requantized by the quantizer.

The combiners of the signal mixer operate on 1-bit signals and so coefficient multiplication is performed as 1-bit multiplication avoiding the need for p bit multipliers which are uneconomic.

Furthermore the DSM also provides noise shaping.

The first and second coefficients define zeroes of the input signal transfer function and maybe fixed or variable, but the third coefficients define poles of the input signal transfer function and are fixed.

If the first and second signals applied to the DSM are produced by unsynchronized sources, synchronisation means are required so the bits of the signals are in phase synchronism at the DSM.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

In a preferred embodiment of the invention, the digital signals are 1-bit signals and the applying means comprises a 1-bit Delta Sigma Modulator.

It is known to convert an analogue signal to a digital form by sampling the analogue signal at least the Nyquist rate and encoding the amplitudes of the samples by an m bit number. Thus if m=8, the sample is said to be quantized to an accuracy of 8 bits. In general m can be any number of bits equal to or greater than 1.

For the purpose of quantizing to only 1 bit, it is known to provide an analogue to digital converter (ADC) known either as a "Sigma-Delta ADC" or as a "DeltaS1 gma ADC". Herein the term "Delta-Sigma" is used. Such an ADC is described in for example "A Simple Approach to Digital Signal Processing" by Craig Marven and Gillian Ewers ISBN 0-904.047-00-8 published 1993 by Texas Instruments.

Figure 1:
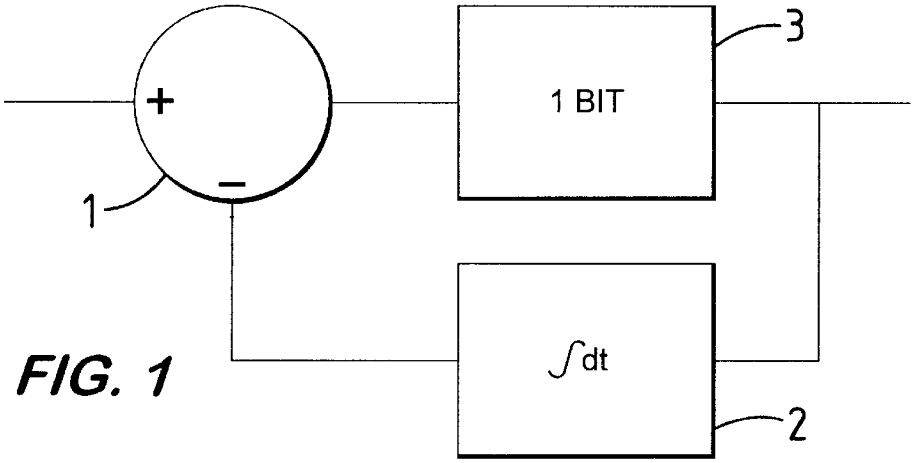
FIG. 1 is a block diagram of a known Delta-S1 gma Modulator.

Referring to FIG. 1 in an example of such an ADC, the difference 1 (Delta) between an analogue input signal and the integral 2 (Sigma) of the 1-bit output signal is fed to a 1-bit quantizer 3. The output signal comprises bits of logical value 0 and 1 but representing actual values of −1 and +1 respectively. The integrator 3 accumulates the 1-bit outputs so that value stored in it tends to follow the value of the analog signal. The quantizer 3 increases (+1) or reduces (−1) the accumulated value by 1-bit as each bit is produced. The ADC requires a very high sampling rate to allow the production of an output bit stream the accumulated value of which follows the analogue signal.

The term "1-bit" signal as used in the following description and in the claims means a signal quantized to an accuracy of 1 digital bit such as is produced by a Delta-Sigma ADC.

Figure 2:
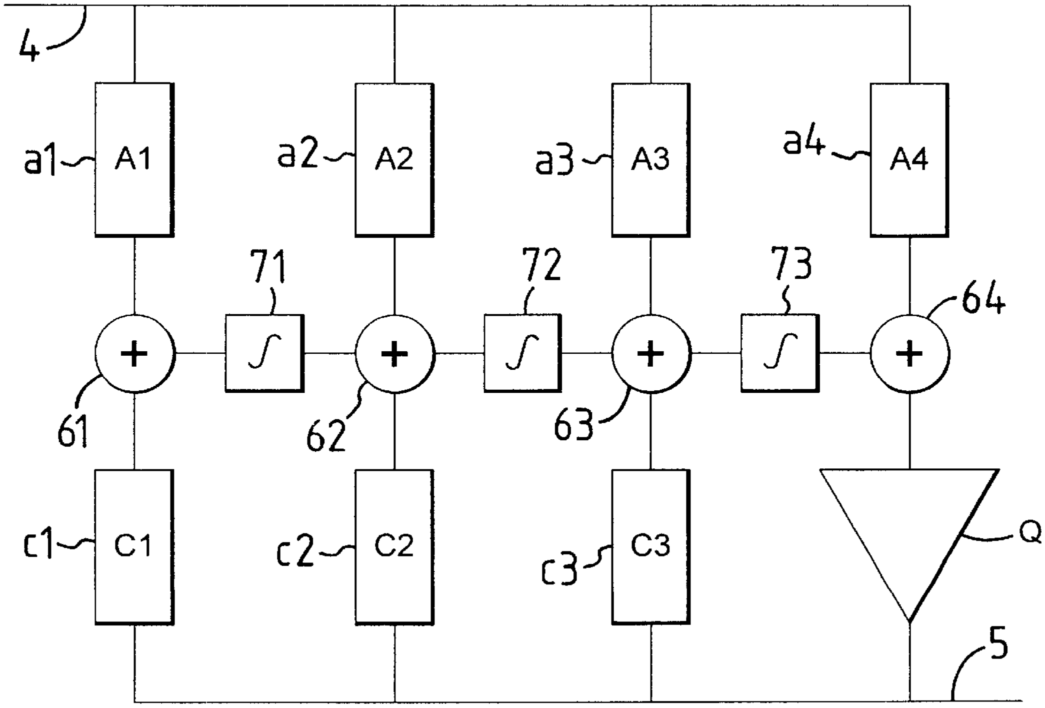
FIG. 2 is a block diagram of a previously proposed Delta-S1 gma Modulator configured as an nth order filter section.

A Delta-Sigma Modulator (DSM) configured as nth order filter section for directly processing a 1-bit signal was proposed by N. M. Casey and James A. S. Angus in a paper presented at 95th AES Convention Oct. 7–10 1993 N.Y., USA entitled "One Bit Digital Processing of Audio Signals"—Signal Processing: Audio Research Group, The Electronics Department, The University of York, Heslington, York YO1 5DD England. FIG. 2 shows a 3rd order (n=3) version of such a DSM filter section.

Referring to FIG. 2, the DSM has an input 4 for a 1-bit audio signal and an output 5 at which a processed a 1-bit signal is produced. The bits of the 1-bit signal are clocked through the DSM by known clocking arrangements which are not shown. The output 1-bit signal is produced by a 1-bit quantizer Q which is for example a comparator having a threshold level of zero. The DSM has three stages each comprising a first 1-bit multiplier $a_1$, $a_2$, $a_3$ connected to the input 4, a second 1-bit multiplier $c_1$, $c_2$, $c_3$ connected to the output 5, an adder $\mathbf{6}_1$, $\mathbf{6}_2$, $\mathbf{6}_3$ and an integrator $\mathbf{7}_1$, $\mathbf{7}_2$, $\mathbf{7}_3$.

The 1-bit multipliers multiply the received 1-bit signal by p bit coefficients $A_1$, $A_2$, $A_3$, $C_1$, $C_2$, $C_3$ producing p bit products which are added by the adders $\mathbf{6}_1$, $\mathbf{6}_2$, $\mathbf{6}_3$ and the sums passed to the integrators 7. In the intermediate stages the adders $\mathbf{6}_2$, $\mathbf{6}_3$ also sum the output of the integrator of the preceding stage. A final stage comprises another 1-bit multiplier $A_4$ connected to the input which multiplies the input signal by a p bit coefficient $A_4$ and an adder 64 which adds the product to the output of the integrator $\mathbf{7}_3$ of the preceding stage. The sum is passed to the quantizer Q.

Within the DSM, two's complement arithmetic is used to represent the positive and negative p bit numbers. The input to the quantizer Q may be positive, quantized at the output as +1(logical 1) or negative quantized at the output as −1 (logical 0).

As observed by Casey and Angus "a one bit processor . . . will produce a one bit output that contains an audio signal that is obscured by noise to an unacceptable level and it is imperative the quantization noise is suitably shaped". The noise which obscures the audio signal is the quantization noise produced by the quantizer Q.

The quantizer Q may be modelled as an adder which has a first input receiving an audio signal and a second input receiving a random bit stream (the quantization noise) substantially uncorrelated with the audio signal. Modelled on that basis, the audio signal received at the input 4 is fed forward by multipliers $a_1$, $a_2$, $a_3$, $a_4$ to the output 5 and fed back by multipliers $c_1$, $C_2$, $C_3$ from the output 5. Thus coefficients A1 to A4 in the feed forward path define zeros of the Z-transform transfer function of the audio signal and coefficients C1–C3 in the feed back path define poles of the transfer function of the audio signal.

The noise signal, however is fed-back from the quantizer by the multipliers $C_1$-$C_3$ so that coefficients C1–C3 define poles of the transfer function of the noise signal. The transfer function of the noise signal is not the same as the transfer function of the input signal.

The coefficients A1 to A4 and C1 to C3 are chosen to provide circuit stability amongst other desired properties.

Figure 3:
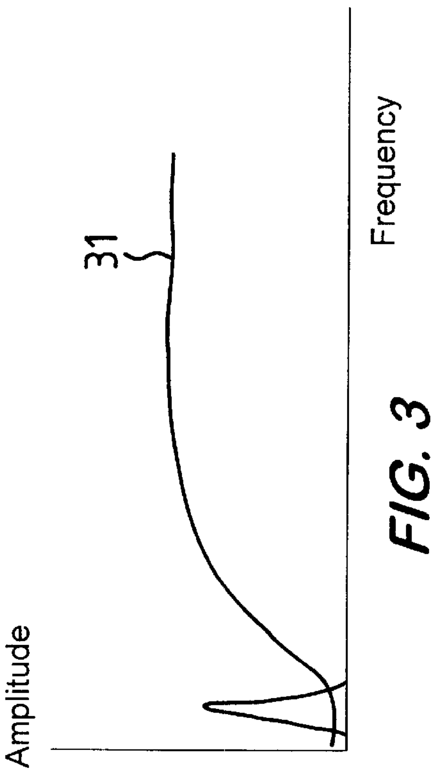
FIG. 3 shows a noise shaping characteristic.

The coefficients C1–C3 are chosen to provide noise shaping so as to minimise quantization noise in the audio band, as shown for example in FIG. 3 bv the full line 31.

The coefficients A1 –A4 and C1–C3 are also chosen for a desired audio signal processing characteristic.

The coefficients A1–A4 and C1–C3 may be chosen by:

a) finding the Z-transform H(z) of the desired filter characteristic—e.g noise shaping function; and b) transforming H(z) to coefficients.

This may be done by the methods described in the paper "Theory and Practical Implementation of a Fifth Order Sigma-Delta A/D Converter, Journal of Audio Engineering Society, Volume 39, no. 7/8, 1991 July/August by R. W Adams et al."and in the paper by Casey and Angus mentioned herein above using the knowledge of these skilled in the art. One way of calculating the coefficients is outlined in the accompanying Annex A.

Figure 5:
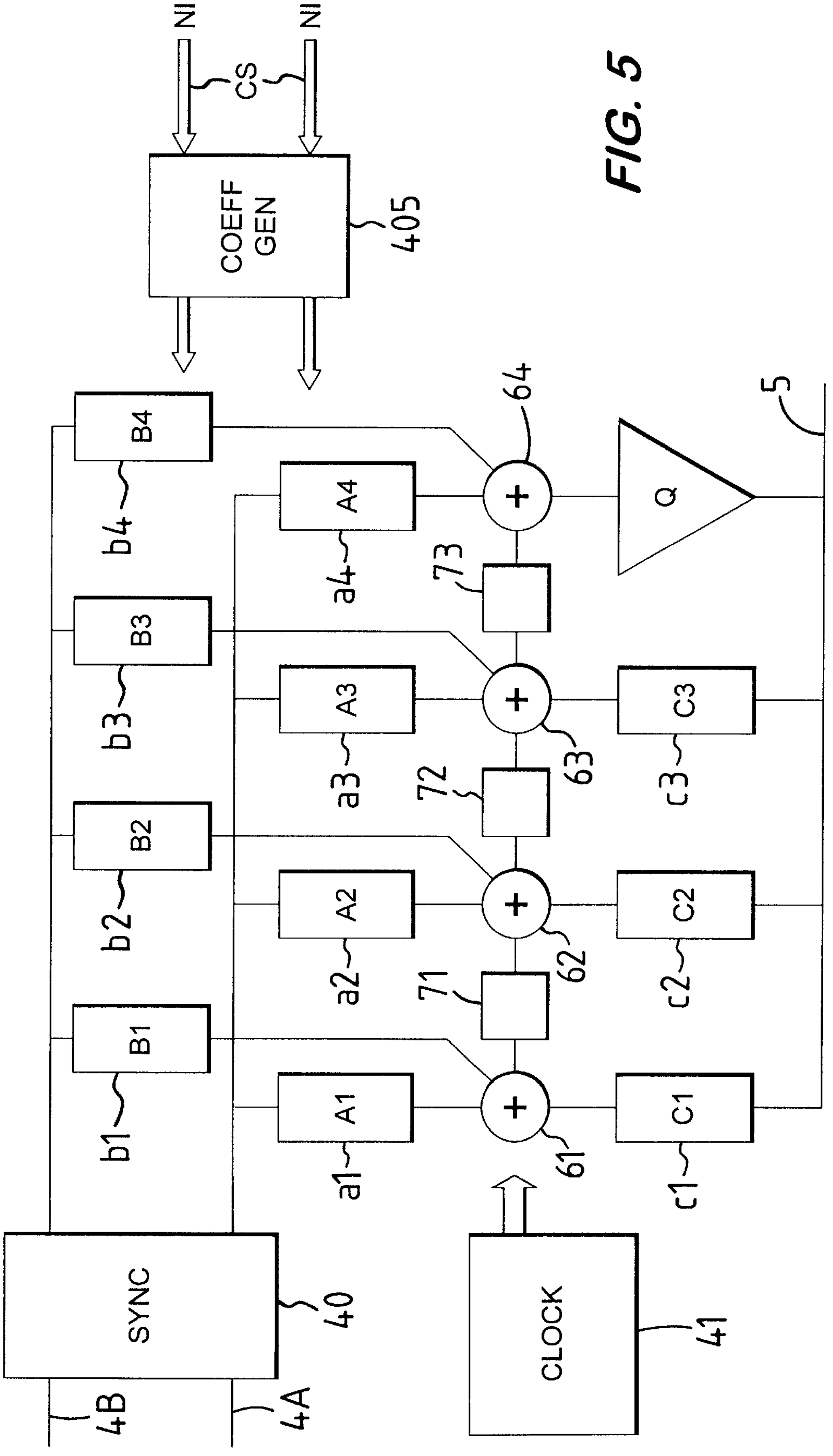
FIG. 5 is a block diagram of a Delta S1 gma Modulator (DSM) useful in the mixer of the processor of FIG. 4.

Referring to FIG. 5, a signal mixer comprises an nth order Delta-Sigma Modulator (DSM) where n is 1 or more. The example shown is a third order DSM (n=3) but n maybe greater than 3.

The order of the DSM is defined by the number of integrator sections. The DSM comprises a first section, n-1 intermediate sections, and a final section. The first section comprises: an adder 61; a first coefficient multiplier $a_1$ connected to a first input 4A of the DSM; a second coefficient multiplier $b_1$ connected to a second input 4B of the DSM; a third coefficient multiplier connected to the output 5 of the DSM; and an integrator 71 which integrates the output of the adder 61. The coefficient multipliers $a_1$, $b_1$, and $c_1$ multiply 1-bit signals by coefficients A1, B1, C1. The adder 61 adds the outputs of the multipliers $a_1$, $b_1$, $c_1$. Each intermediate integrator section comprises: an adder 62, 63 having four inputs; an integrator 72, 73; a first coefficient multiplier $a_2$, $a_3$ connected to the first input of the DSM for multiplying a first 1-bit signal by a coefficient A2, A3; a second coefficient multiplier $b_2$,$b_3$ connected to a second input of the DSM for multiplying the second 1-bit signal by a coefficient B2, B3; and a third coefficient multiplier C2, C3 connected to the output of the DSM for multiplying the 1-bit output signal of the DSM by a third coefficient C2, C3. The adder 62, 63 adds the outputs of the multipliers connected thereto to the output of the integrator of the preceding stage.

The final stage of the DSM comprises an adder 64 having three inputs connected to: a first coefficient multiplier $a_4$ for multiplying the first signal by a first coefficient A4 ; a second coefficient multiplier b4 for multiplying the second signal by a second coefficient B4; and the output of the integrator 73 of the preceding stage. The adder 64 has an output connected to a quantizer Q.

The multipliers $a_1$, to $a_4$, $b_1$, to $b_4$ and $c^1$ to $c_4$ are all 1-bit multipliers, which multiply the 1-bit signals applied to them by p bit coefficients to produce p bit multiplicands.

The adders 61 to 64 and the integrators 71 to 73 operate on the p bit signals.

The p bit signals are represented in twos complement form for example whereby positive and negative numbers are represented.

The quantizer Q is a comparator having a threshold level of zero. Negative inputs to the quantizer are encoded as −1 (logic 0) and positive inputs as +1 (logical 1), to produce the 1-bit output at output 5.

The first and second 1-bit signals are applied to inputs 4A and 4B. A synchronisation circuit 40 is provided to synchronise the first and second signals to a local clock provided by a clock circuit 41. The synchronisation circuit may separately synchronize the two input signals to the local clock. Clock circuit 41 also controls the clocking of the DSM.

The coefficients A1 to A4 , B1 to B4 and C1 to C3 are chosen using the methods described in the above mentioned papers to provide a) circuit stability; and b) noise shaping.

The coefficients C1 to C3 have fixed values to provide the noise shaping.

The coefficient A1 to A6 and B1 to B4 define zeros of the transfer function of the input signals and thus control the gain applied to the signals.

Figure 6:
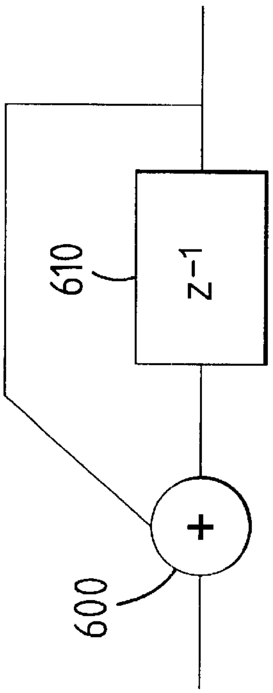
FIG. 6 is a block diagram of an integrator useful in the DSM of FIG. 5.

Referring to FIG. 6, an integrator 71, 72, 73 is shown. It comprises an adder 600, a 1-bit period delay 610 and a feedback path from the output of the delay to the adder. The adder 600 may be the adder 61, 62, 63 of the stage of the DSMI instead of being separate therefrom.

In accordance with an embodiment of the present invention, the coefficients A1 to A4 and B1 to B4 are variable to allow the first and second signals to be mixed in variable proportions. The variable coefficients A1 to A4 , B1 to B4 are generated by a coefficient generator 405 described herein below.

Figure 4:
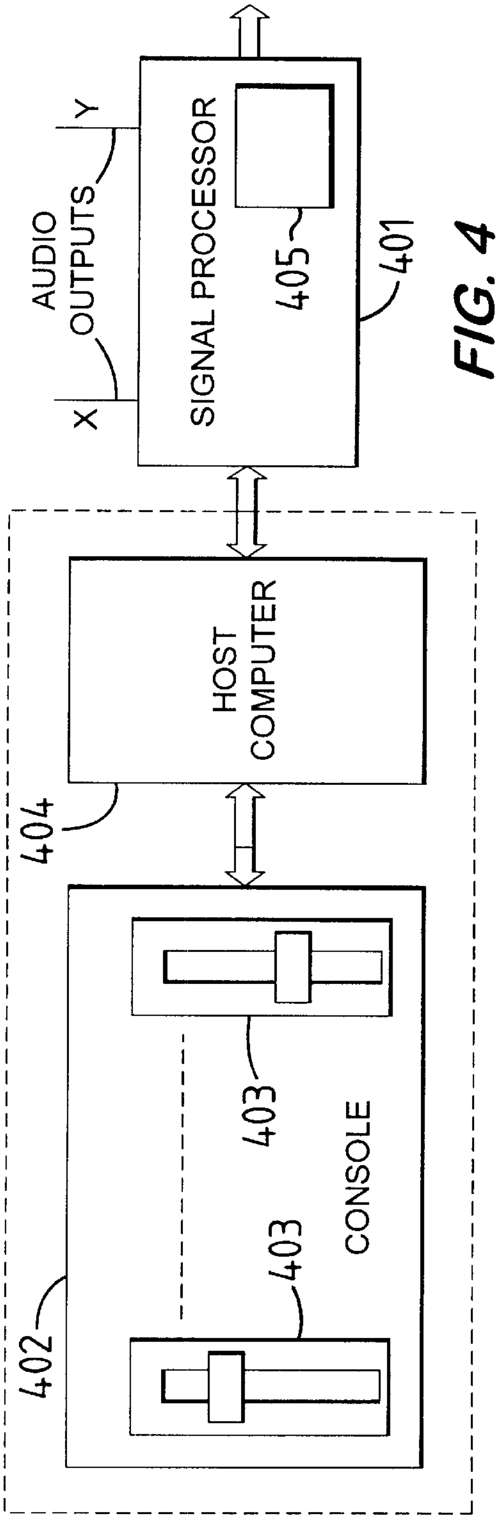
FIG. 4 is a schematic block diagram of an audio signal processor.

Referring to FIG. 4, a signal mixing system embodying the invention comprises:

a digital signal processor 401 having a large number (m) of signal inputs of which only two X and Y are shown and which includes many DSM mixers as shown in FIG. 5;

a control console 402 having a large number of manually operated gain controls 403; and a host computer 404.

In a preferred embodiment of the invention the console 402 is not a set of electromechanical transducers but instead is a set of 'virtual controls'displayed on a touch sensitive display associated with the host computer 404. However, the console may comprise such transducers or such transducers and virtual controls.

The computer 404 samples the settings of the gain controls 403 and controls the corresponding channels of the signal processor 401 to apply the set gains to the audio signals received at the inputs such as X and Y.

Figure 7:
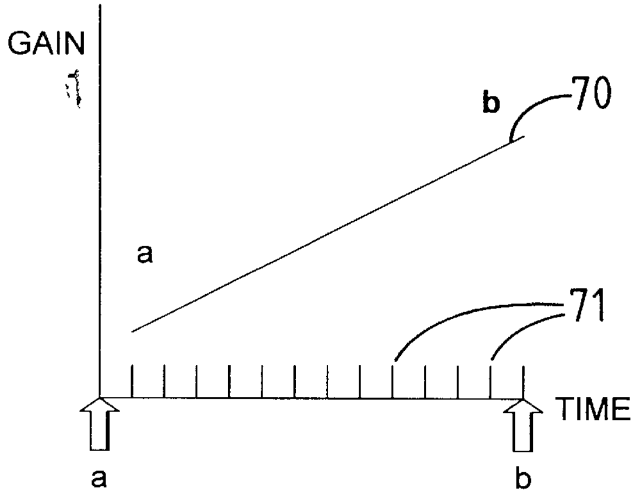
FIG. 7 is a signal amplitude-time diagram for explaining the operation of the present invention

Referring to FIG. 7 the computer 404 samples the gain setting of controls 403 at a rate S2 which in this example is $\frac{1}{2}^{16}$th of the 1-bit signal sampling rate S1 which is about 2.8 MHz for example. The computer samples the gain setting of a control m at times a and b. It stores each setting and for each setting calculates a set of coefficient values for the coefficients e.g. A1 to A4 of the channel which is controlled by control m. The computer then calculates an incremental value δA dependent on $(b-a)/2^{16}$ for each of the calculated coefficient values A1 to A4 . This increment is then used in a linear interpolation represented by the line 70 in FIG. 7 to change each of the coefficient values in $2^{16}$ steps each dependent on $(b-a)/2^{6}$ synchronously with the 1-bit signal samples 71.

Figure 8:
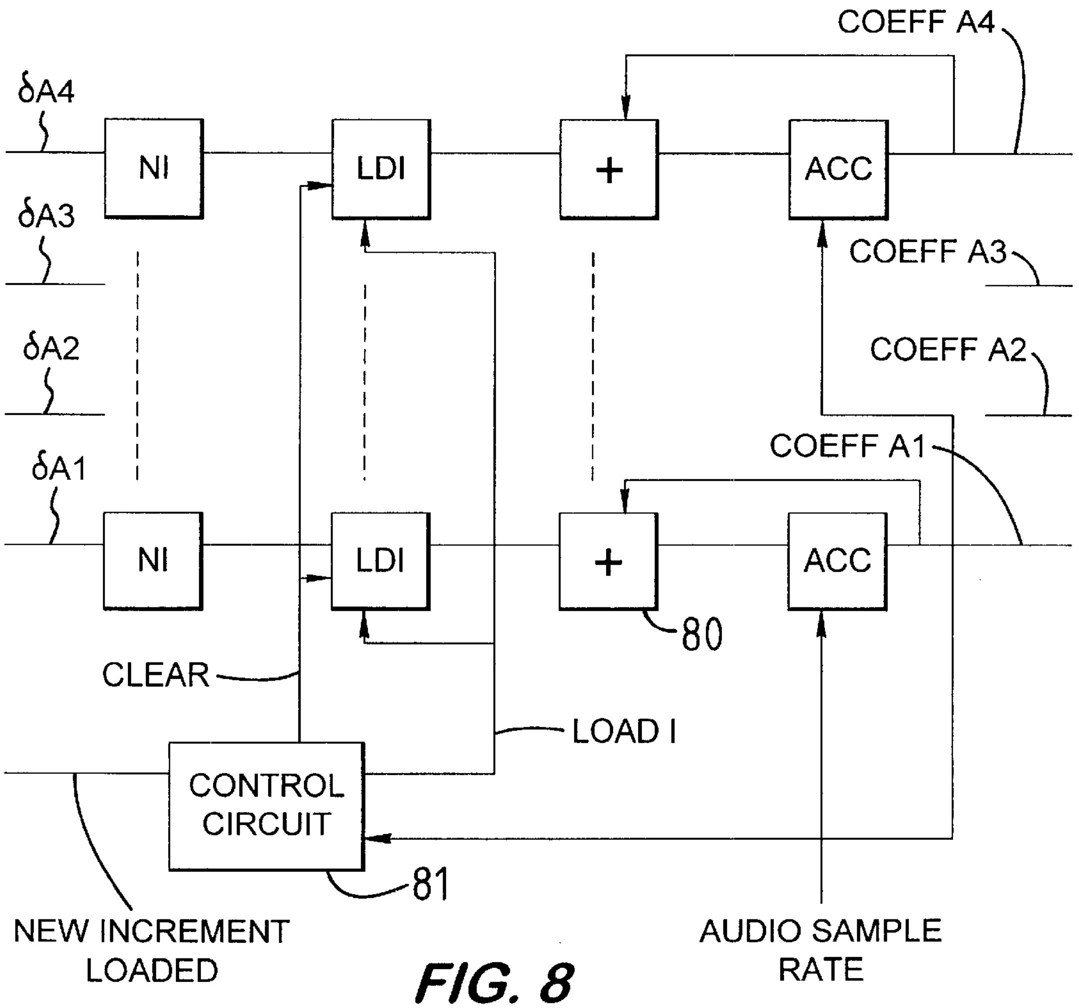
FIG. 8 is a block diagram of a coefficient generator useful in an embodiment of the present invention.

Referring to FIGS. 5 and 8 the coefficient generator 42 of FIG. 5 receives for one channel of the mixer, from the host computer, a set of coefficient increments NI dependent on $(b-a)/2^{6}$ of one control m. There is an increment NI=δA for each of the coefficients A1 to A4 for one control or one signal processing channel.

Referring to FIG. 8 the coefficient generator comprises for each coefficient A1, A2, A3 or A4 of a set:

a first register NI into which a new value of the increment δA is loaded by the host computer 404;

a second register LDI connected to the first register NI and into which the increment is loaded when a previous sequence of $2^{16}$ interpolations has been completed; and a third register ACC which is coupled to the register LDI via an adder 80 which adds the value in ACC to the increment in LDI to accumulate a successively increasing value in ACC.

The addition takes place once per 1-bit signal sample. Thus after 216 samples register ACC contains the coefficient value corresponding to gain setting b as sampled at time b by the host computer 404.

After the 216 samples the value in register LDI is cleared to zero. Thus if there is no change in the setting of the manual control 403 the value in ACC is maintained unchanged. If a new value is loaded into NI, the new value is transferred to LDI and the incrementing process starts anew.

The loading and clearing of the registers is controlled by a control circuit 81 of the coefficient generator 405 which co-operates with the host computer 404.

Figure 9:
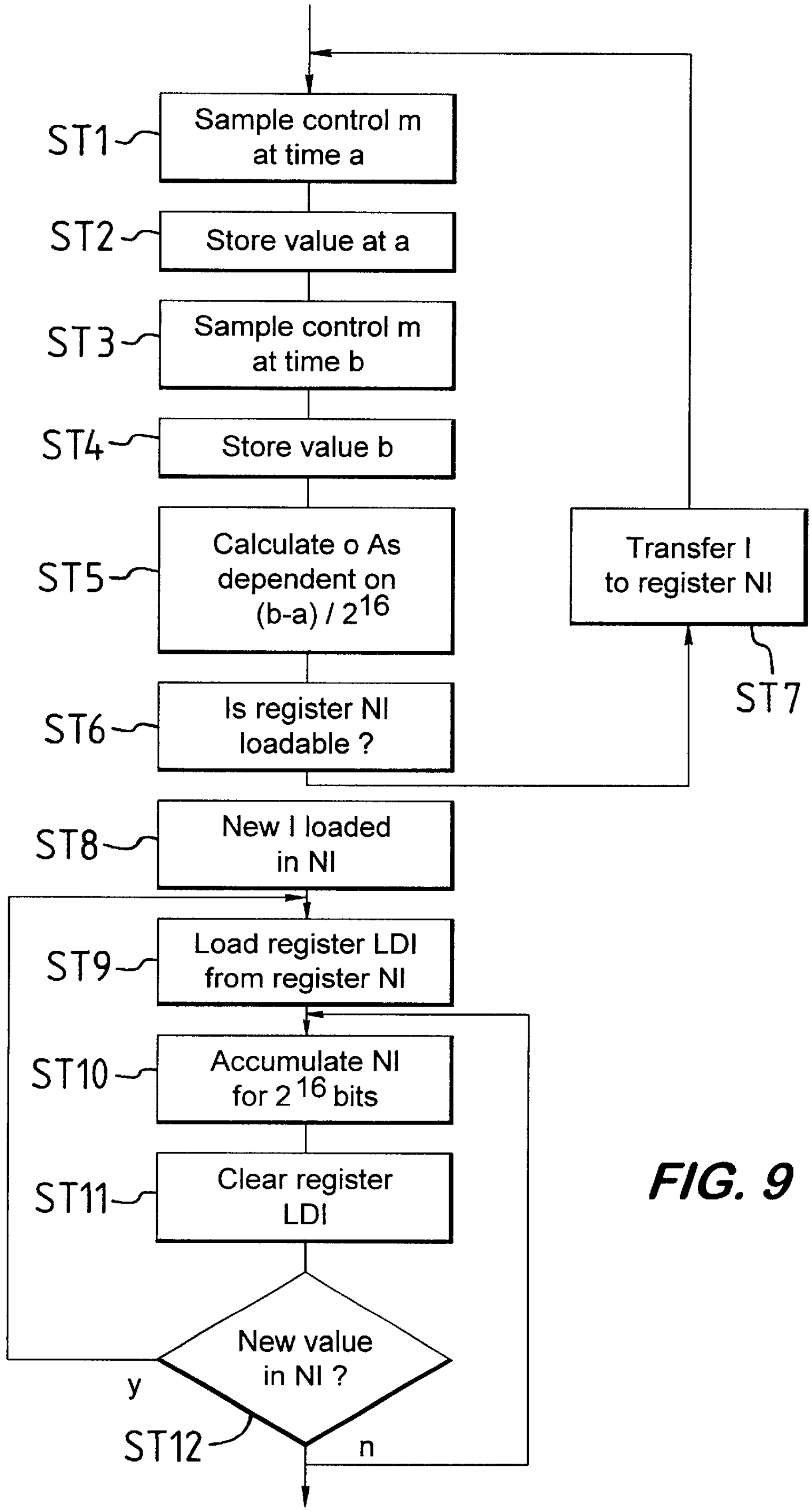
FIG. 9 comprises flow diagrams illustrating the operation of the processor of FIGS. 4, 5 and 8.

Referring to FIG. 9, the host computer 404 at step ST1 samples the setting a of control m at time a and stores the value at step ST2. The value is again sampled at time b in step ST3 and stored as value b at step ST4. At step ST5 the host computer calculates a set of increments $\delta A_1$, $\delta A_2$, $\delta A_3$, $\delta A_4$ of coefficients A1 to A4 for the DSNI of value dependent on $(b-a)/2^{6}$. At step ST6, the computer 404 interrogates the control circuit 81 to determine if the contents of the registers NI have been transferred to register LDI. If yes, the increments 5A are transferred to registers NI at step ST7. This transfer of the set of increments to the register NI takes place at any time after the transfer of previous increments to register LDI. The control circuit 81 in the coefficient generator receives at step ST8, from the host computer, a flag indicating that a new set of increments has been loaded into NI at step ST7. If the previous incrementing has finished the control circuit loads the new set of increments into LDI at step ST9 and then increments. The value in the accumulator register ACC $2^{16}$ is incremented at step ST10 $2^{16}$ times synchronously with the 1-bit signal samples. After $2^{16}$ increments LDI is cleared to zero at step ST11. If at ST12 there is a new set of increments loaded in the registers -NI the sequence returns to step ST9; otherwise the value in ACC is maintained by returning the sequence of steps to ST10 whereby zero is added $2^{16}$ times to the value in ACC.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A processor for processing a digital audio signal, comprising:

a Delta Sigma Modulator for processing said digital audio signal as a 1-bit signal at a first sampling rate S1 on the basis of a set of coefficients generated from a set of signal parameters;

a plurality of manually adjustable controls for setting said set of signal parameters;

reading means for reading the signal parameters set by said plurality of manually adjustable controls at a second sampling rate S2; wherein the first sampling rate S1 is at least n times the second sampling rate S2;

coefficient generating means for generating, in n increments, coefficients corresponding to changes in the read signal parameters and supplying the incrementally generated coefficients to the Delta Sigma Modulator at the first sampling rate S1; whereby adjustments to the set of signal parameters are smoothly applied by the processor.

2. The processor according to claim 1, wherein the Delta Sigma Modulator is configured as an n-th order filter for processing said 1-bit signal.

3. The processor according to claim 1, wherein a plurality of digital input signals are input to the Delta Sigma Modulator for mixing on the basis of the set of coefficients.

4. The processor according to claim 1, wherein the coefficient generating means comprises a first store for storing the incrementally generated coefficients, means for accumulating the incrementally generated coefficients as each increment is supplied to the Delta Sigma Modulator; and a second store for storing the accumulated coefficients.

* * * * *